(12) United States Patent
Kado et al.

(10) Patent No.: US 6,239,753 B1
(45) Date of Patent: May 29, 2001

(54) TRANSMITTER-AND-RECEIVER DEVICE

(75) Inventors: Seiji Kado; Kazuhiko Sato, both of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 08/826,786

(22) Filed: Apr. 7, 1997

(30) Foreign Application Priority Data

Apr. 5, 1996 (JP) .................................................... 8-110112
Jul. 19, 1996 (JP) .................................................... 8-208830

(51) Int. Cl.$^7$ .................................................... H01Q 1/24
(52) U.S. Cl. ........................... 343/702; 343/749; 343/866
(58) Field of Search .................................... 343/702, 866, 343/867, 895, 700 MS, 829, 846, 872, 741, 742, 749; H01Q 1/24

(56) References Cited

U.S. PATENT DOCUMENTS

| | | | |
|---|---|---|---|
| 4,491,843 | * | 1/1985 | Boubouleix .......................... 343/702 |
| 4,721,962 | * | 1/1988 | Gorzel ................................. 343/702 |
| 5,144,324 | * | 9/1992 | Chin et al. .......................... 343/702 |
| 5,227,804 | * | 7/1993 | Oda ..................................... 343/702 |
| 5,668,560 | * | 9/1997 | Evans et al. ........................ 343/702 |
| 5,914,696 | * | 6/1999 | Vanderhelm et al. ............... 343/841 |
| 5,940,040 | * | 8/1999 | Koyamagi et al. .................. 343/702 |

OTHER PUBLICATIONS

Cooper, "Airborne Low–VHF Antennas", AGARD, Fig 12, Nov. 1973.*

* cited by examiner

*Primary Examiner*—Tho Phan
(74) *Attorney, Agent, or Firm*—Foley & Lardner (57) ABSTRACT

An earthing conductor is disposed on the reverse of a print board, and a signal process circuit section including a transmit-and-receive circuit is disposed on the right side of the board. A loading coil is mounted on the right side of the board across a print pattern of the signal process circuit section and a print pattern of an antenna. A vertical portion of the antenna projects from the print pattern of the antenna on the print board, and a horizontal portion of the antenna horizontally extends from a top end of the vertical portion in parallel with the print board.

28 Claims, 12 Drawing Sheets

TRANSMITTER-AND-RECEIVER DEVICE

BACKGROUND OF THE INVENTION

1. Field of the Invention

This invention relates to a transmitter-and-receiver device housing an antenna therein, and more particularly to an improved device applicable to a receiver of a battery-type keyless entry system mounted on a vehicle.

2. Discussion of the Related Art

There are conventionally employed a Yagi antenna or a helical antenna as a UHF beam antenna particularly in a band between 300 MHz and 400 MHz. Since the Yagi antenna is bulky and cannot be installed within a small transmitter-and-receiver device, the helical antenna is employed as an antenna internally installed in such a device.

Figure 19:
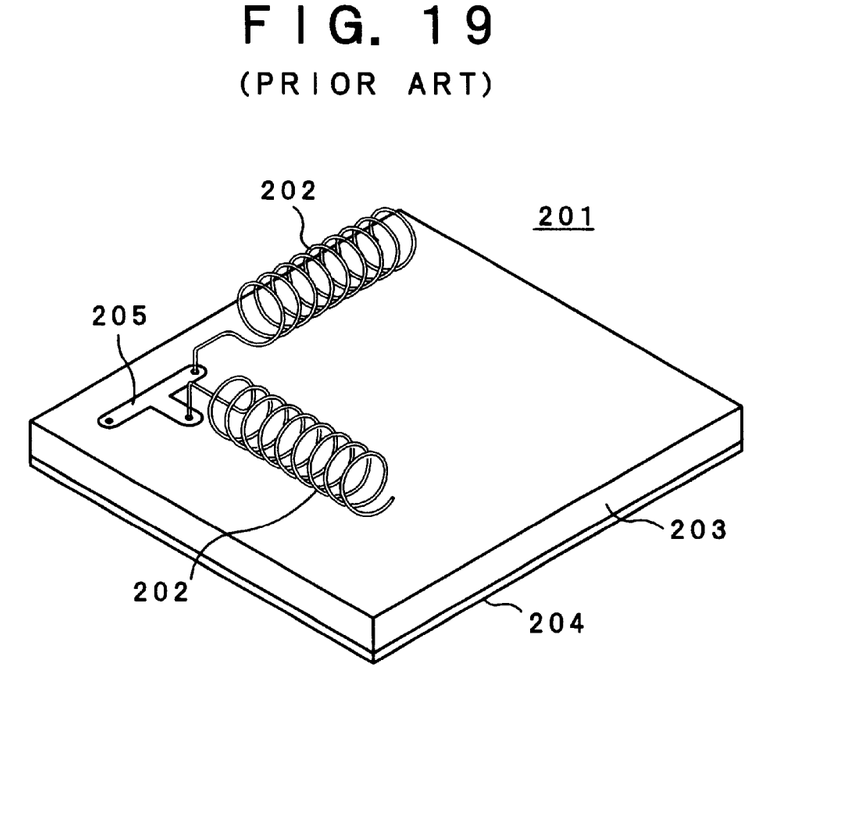
FIG. 19 shows a schematic perspective view of a conventional transmitter-and-receiver device having a helical antenna mounted on a print board.
Figure 20:
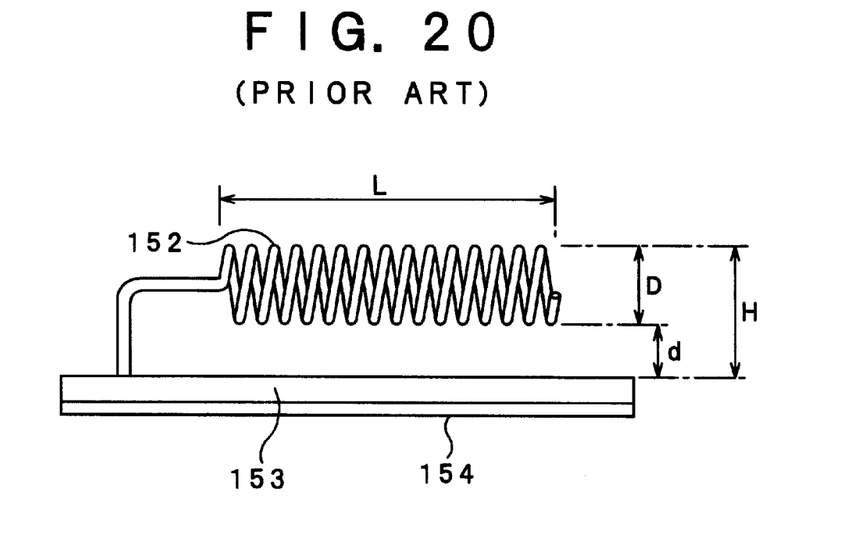
FIG. 20 shows a schematic front view of the device of FIG. 19.

FIG. 19 shows a schematic perspective view of a conventional transmitter-and-receiver device 201 housing a pair of helical antennas 202, and FIG. 20 shows a schematic front view of the device. An earthing conductor 204 is disposed below a lower wall of a print board 203 and a transmit-and-receive circuit section (not shown in drawings) is mounted on an upper wall of the board 203. The pair of helical antennas 202 are connected in parallel and disposed in an orthogonal relationship wherein helical axes thereof are in parallel with the print board 203. Each one end of the helical antennas 202 is connected with a feeder print pattern 205 connected with the transmit-and-receive circuit section.

The helical antenna 202 is of a dipole type to serve both as a loading coil function for increasing an electric length of an antenna (viz. for decreasing the antenna length) and an antenna function, but not satisfactory for miniaturizing and thinning the transmitter-and-receiver device 201. In order to miniaturize and thin the transmitter-and-receiver device 201 housing the helical antenna 202, it can be proposed to decrease a coil diameter D and a whole length L of the helical coil 202 and to lower a whole height H of the antenna.

Decreasing the coil diameter D and the whole length L of the helical antenna 202 decreases a volume (an effective volume of the antenna) for receiving and transmitting a radio wave, whereby unfavorably the receive sensitivity of the transmitter-and-receiver device 201 is lowered and the transmit power is decreased.

A radio wave is radiated from a slit space between the helical antenna 202 and the print board 203. As the whole height H of the helical antenna 202 is lowered, the gap "d" is decreased and a transmit-and-receive resistance (radiation resistance) is increased so that a radio wave is hard to be radiated or injected.

The helical antenna 202 has the disadvantages that an input impedance viewed from the feeder print pattern or portion 205 is too small to make an impedance matching and its loss is large because the electrical length of the antenna has to be designed to be ¼ of a wavelength in use.

Figure 22:
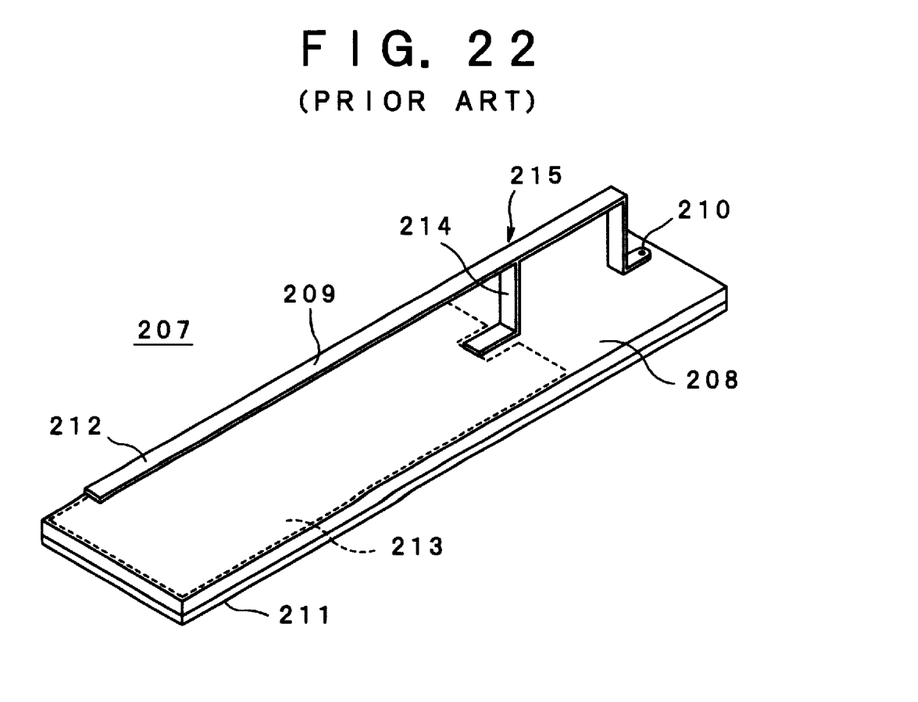
FIG. 22 shows a schematic perspective view of another conventional transmitter-and-receiver device.

In FIG. 22 there is shown a conventional transmitter-and-receiver device 207 provided with an antenna easy for impedance matching. In the device 207, a rear end of an antenna body 209 disposed in parallel with a print board 208 is bent toward the board 208, and an earth end 210 formed on the rear end is fixed to the print board 208 to be electrically connected to an earthing conductor 211 of the board. A front end of the antenna body 209 is an open end 212. A feeder line 214 is extending from a middle of a portion of the antenna body 209 in parallel with the board 208 to connect the antenna 209 with a transmit-and-receive circuit 213. A tip end of the feeder line 214 is fixed to the print board 208 to be connected with the transmit-and-receive circuit 213 disposed on the board.

Thus, F-shaped antenna 215 is formed by the antenna body 209 and the feeder line 214, and provided with the earth end 210 at one end thereof across the feeder line 214 and the open end 212 at another end thereof. The input impedance can be easily adjusted by moving the feeder position on the antenna body 209 from the earth end 210 and the open end 212. The transmitter-and-receiver device 207 provided with the antenna 215 is not proper for miniaturizing the antenna and the device because the whole length of the antenna must be designed to be λ/4 of a desired frequency.

SUMMARY OF THE INVENTION

It is, therefore, a primary object of this invention to provide an improved compact transmitter-and-receiver device in which an antenna may be miniaturized and thinned without decreasing a receive sensitivity and increasing a transmit-and-receive resistance.

It is a further object of this invention to provide an improved transmitter-and-receiver device which is provided with an antenna disposed to be parallel with a print board to miniaturize the antenna or the device.

According to a first aspect of this invention there is provided a transmitter-and-receiver device including a circuit board having an earthing conductor and a transmit-and-receive circuit section which are disposed on the board, a loading coil disposed on the circuit board, and an antenna electrically connected with the transmit-and-receive circuit section through the loading coil. The transmitter-and-receiver device includes a transmitter, a receiver, and a transmitter-and-receiver. The loading coil is disposed to increase an electric length of the antenna and to reduce the antenna length, and also called as an extension coil. The antenna and the loading coil are separated and the loading coil is mounted on the circuit board, so that an antenna of a wire type or a belt type other than the coil type can be employed and thinned. In other words, the antenna is thinned by a coil diameter of a conventional helical antenna, and the transmitter-and-receiver device is miniaturized. By thinning the antenna the distance (a height of the antenna) between the antenna and the circuit board can have room, whereby the transmit-and-receive resistance is decreased and drop of an efficiency of the antenna is relatively reduced even if the transmitter-and-receiver device is miniaturized.

Since a phase of a signal necessary for resonance in the antenna of this invention is for the most part (viz. about π/2) served by a loading coil, the phase is almost arranged at an open end of the antenna and the drop of receive sensitivity and the transmit power is minimized in miniaturizing the transmitter-and-receiver device.

When the antenna is necessary to have a different frequency specification, the loading coil has only to be replaced without changing a main body of the antenna, and components can be in common use with reducing its manufacturing cost.

The loading coil of the transmitter-and-receiver device may employ a print coil, a chip coil or a small wound coil, or the like. Thus loading coil can be easily mounted on the circuit board. Accordingly, the productivity of the device is improved and its manufacturing cost is reduced.

The antenna of the transmitter-and-receiver device according to this invention may be horizontally bent from a vertical direction on a surface of the circuit board in an L-shape without vertically standing on the surface of the circuit board, so that the height of the device can be reduced and the device can be miniaturized and thinned.

A portion of the antenna in parallel with the surface (the right side) of the circuit board may be bent within a plane in parallel with the surface of the circuit board, or the antenna may be bent within the plane in parallel with the circuit board and along a peripheral edge of the board.

Thus, if the antenna is extended by bend within a plane parallel to the board, its whole length can be prolonged without bulking the antenna. Thus, the transmitter-and-receiver device can be made in a compact construction with improvement of the transmit-and-receive efficiency.

If necessary, an antenna support may be disposed between the antenna and the circuit board for supporting the antenna. By supporting the antenna with the antenna support, the antenna is prevented from being swung by external vibration with improving a vibration-resistant of the antenna. Accordingly, the receive sensitivity of the transmitter-and-receiver device is prevented from being unstable by vibration, and the antenna also is protected from being broken by vibration.

The transmitter-and-receiver device may have a construction that the earthing conductor employs a metal housing enclosing the transmit-and-receive circuit section and the antenna is disposed around a periphery of the metal housing, whereby the device may be miniaturized without decreasing the receive sensitivity and the transmit power and increasing a transmit-and-receive resistance.

According to a second aspect of this invention, there is provided an improved transmitter-and-receiver device which includes a circuit board on which an earthing conductor, an antenna pattern and a transmit-and-receive circuit section are disposed, and an antenna body electrically connected with the antenna pattern on the circuit board to form an antenna with the antenna pattern, wherein one end of the antenna body opposite to a connection side connected with the antenna pattern is an open end, one end of the antenna pattern opposite to a connection side connected with the antenna body is an earth end, and a feeder line is electrically connected in a middle between a connection portion with the antenna body and the earth end of the antenna pattern. The transmitter-and-receiver device includes a transmitter, a receiver, and a transmitter-and-receiver.

According to the second aspect of this invention, the antenna is constituted with the antenna pattern on the print board and the antenna body disposed above the print board, and the earth end and the open end are disposed across a position of the feeder line to provide a construction similar to that of a conventional reverse F-shaped antenna. Accordingly, the input impedance is easily adjusted by moving the feeder position. Since the antenna is constituted with the antenna body and the antenna pattern, a part of the electric length necessary for the antenna can be served by the antenna pattern on the circuit board to miniaturize the antenna and the transmitter-and-receiver device.

The construction in which a part of the antenna is represented by the pattern on the circuit board provides the transmitter-and-receiver device with an improved productivity and a reduced manufacturing cost.

The antenna body may be bent within a plane parallel to a surface of the circuit board. If thus antenna body is elongated by bend within a plane parallel to the circuit board, the whole length of the antenna can be elongated without enlarging the antenna body. The transmitter-and-receiver device may have a compact construction with improving the transmit-and-receive efficiency of the antenna.

A coil may be disposed on the antenna pattern. Particularly a coil may be mounted on the antenna pattern in a middle between the connection portion thereof with the antenna body and the feeder line, and a coil may be further disposed on the antenna pattern in a middle between the feeder line and the earth end.

By serving a part of the antenna as the antenna pattern, a coil for elongating the electric length may be mounted on the antenna pattern as a single component so that the antenna and the device can be further miniaturized.

When an antenna having a different frequency specification is required to be produced, the mounted coil for enlarging the electric length has only to be changed to a coil having a different constants without changing the antenna body and the antenna pattern, resulting into cost reduction by a common use of the components.

The construction in which coils are mounted on the antenna pattern on both sides of the feeder line enables the input impedance to be variably adjusted without changing the position of the feeder line.

According to this second aspect of this invention, a capacitor may be mounted on the antenna pattern. A capacitor may be mounted on the antenna pattern between the connection portion with the antenna body and the feeder line, and another capacitor may be mounted on the antenna pattern between the feeder line and the earth end.

Though the electric length can be adjusted by the capacitor on the antenna pattern, the adjustment is limited to elongation of the electric length. In case there is found a high advantage in miniaturization of the antenna by the antenna pattern, a small antenna at a desired frequency can be provided by adjusting the frequency (wavelength) with the capacitor. Accordingly, in the device employing a capacitor, when an antenna satisfying a different frequency specification is required to be produced, a constant of the capacitor has only to be changed without changing the antenna body and the antenna pattern, and a cost reduction may be found in common use of components. Moreover, the input impedance may be adjusted by adjusting constants of the capacitors on both sides of the feeder line without changing the position of the feeder line. The employment of such capacitors lowers cost of production in comparison with employment of coil.

The transmitter-and-receiver device may be modified by disposing the antenna pattern and the feeder line at an interval and connecting the antenna pattern with the feeder line through a connection element. In case the antenna pattern and the feeder line are connected through the connection element, the position of the feeder line can be easily moved by adjusting the position of the connection element to easily provide a desired impedance.

An antenna support may be employed between the antenna body and the circuit board to support the antenna body. The antenna body supported by the antenna support is prevented from being swung by external vibration, whereby the vibration resistance of the antenna is improved. Accordingly, it is prevented to make the receive sensitivity unstable by vibration and also to cause the antenna to be broken by vibration.

A metal housing enclosing the transmit-and-receive circuit section therein may be employed as an earthing conductor, and the antenna body may be designed to surround the metal housing. In this construction, the transmitter-and-receiver device may be miniaturized without lowering the receive sensitivity and the transmit power nor enlarging the transmit-and-receive resistance.

BRIEF DESCRIPTION OF THE DRAWINGS

Other objectives and advantages of this invention will be more readily apparent from the following detailed description provided in conjunction with the following figures, of which.

DETAILED DESCRIPTION OF THE INVENTION

Figure 1:
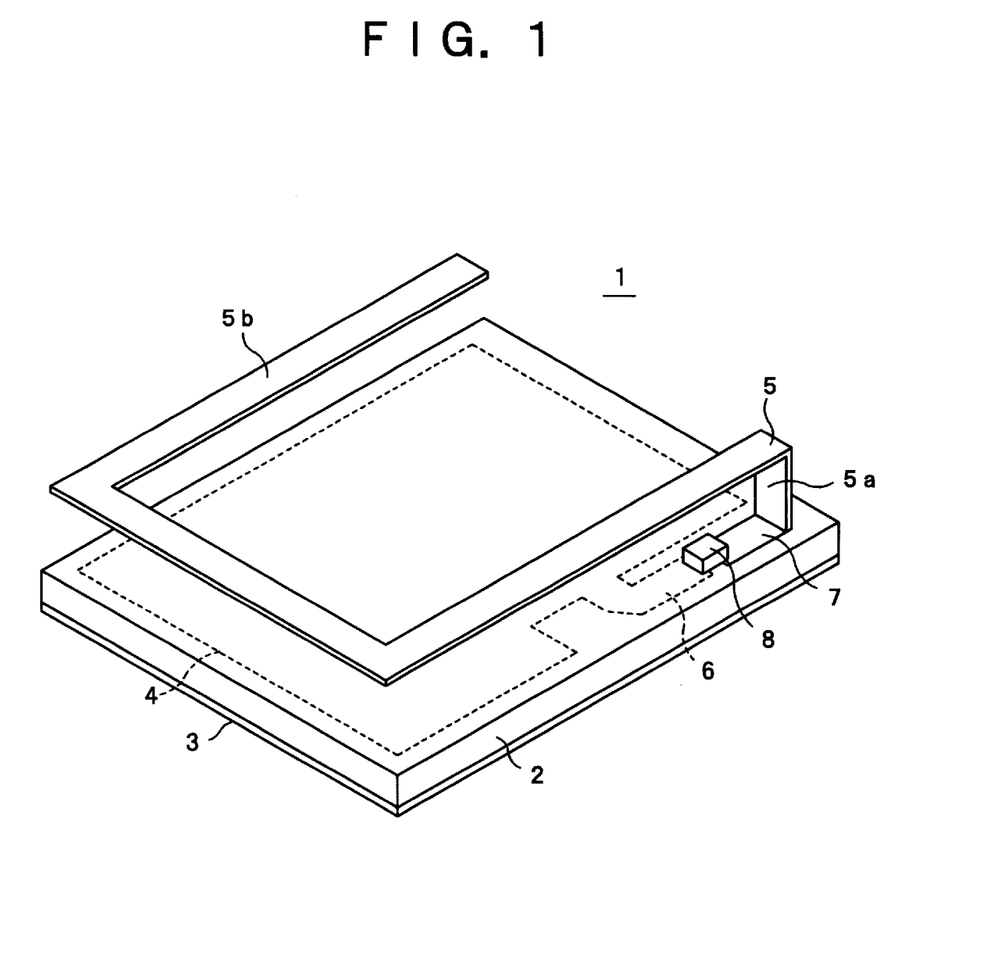
FIG. 1 is a perspective view of a transmitter-and-receiver device as a first embodiment of this invention.

Referring, now, to FIG. 1, there is shown a schematic perspective view of a transmitter-and-receiver device 1 according to a first embodiment of this invention. An earthing conductor 3 is disposed over a lower wall of a print board 2. On an upper wall or surface of the board there are disposed a signal process circuit section 4 (a mounting area thereof is shown by a dotted line in FIG. 1) including a transmit-and-receive circuit and an antenna 5. On the upper wall of the print board 2 a print pattern 6 of the signal process circuit section 4 confronts a print pattern 7 (feeder point) of the antenna 5, and a loading coil 8 is connected in series across the patterns 6 and 7. The loading coil 8 may employ a copper foil print coil forming an electrode pattern of a coil shape, a laminated chip coil forming an electrode pattern of a coil shape within a magnetic material layer, or a small wound coil of a mounting type such as a solenoid type or a troidal type which is small relative to the antenna 5.

The antenna 5 except the print pattern 7 is made of a thin metal plate such as an aluminum plate. The antenna 5 vertically rises at the print pattern 7 from the print board 2, and includes a horizontal portion 5b disposed on a tip of such a vertically risen portion 5a. A major portion of the antenna 5 is in parallel with the print board 2, and the height of the antenna 5 is lowered to thin the device 1. Moreover, the horizontal portion 5b of the antenna 5 is bent within a plane in parallel with the print board 2 to elongate the antenna length within a limited area, and along a peripheral edge of the print board 2 to ensure a distance between respective portions of the antenna and to prevent the device 1 from being enlarged by extending the antenna 5 beyond the peripheral edge of the print board 2. Bending the antenna 5 decreases a directivity of the antenna and enables a radio wave to be transmitted and received in a wide angle.

Thus, the antenna 5 and the loading coil 8 are separated and the loading coil 8 is mounted on the circuit board 2, so that the antenna 5 may be of a wire type or a belt type. In other words, the antenna 5 is thinned by a coil diameter D of a conventional helical antenna (202 of FIG. 19), and the transmitter-and-receiver device 1 is miniaturized.

Figure 2:
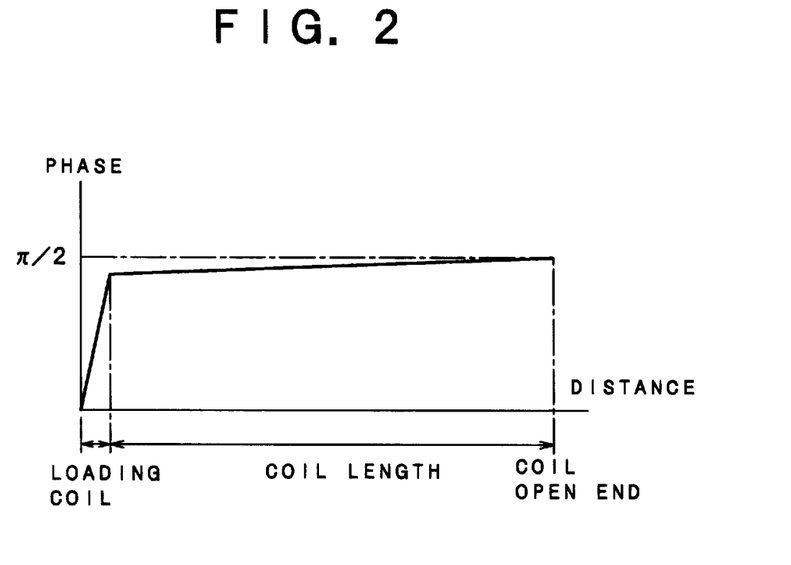
FIG. 2 shows a relation between a distance along an antenna and a phase of a signal employed in the device of the first embodiment.
Figure 21:
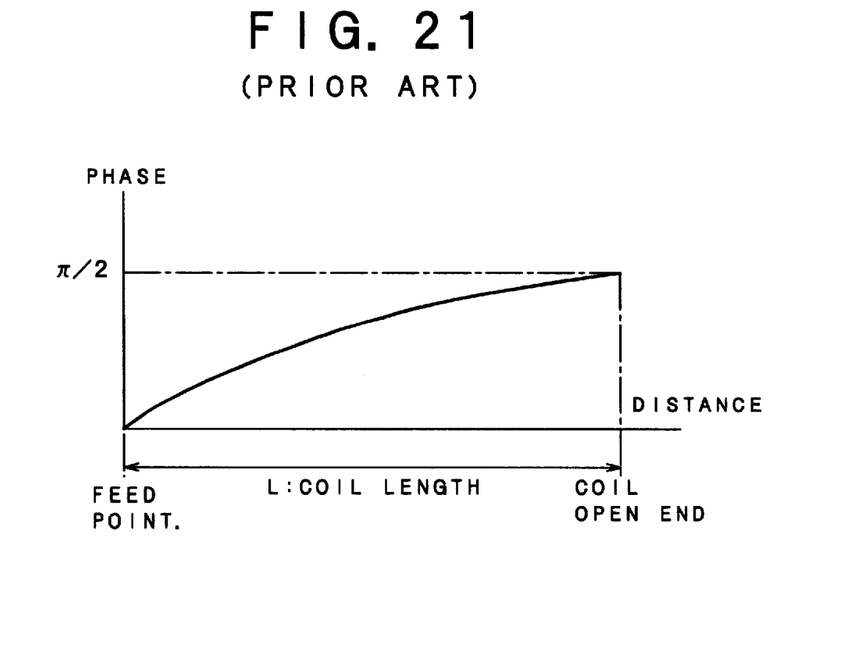
FIG. 21 shows a relation between a distance along an antenna portion of a helical antenna and a phase of a signal.

In addition to such miniaturization the free degree for forming an antenna is increased. In other words, when an effective wavelength of a signal is represented by "$\lambda g$", the length of the antenna 5 should be one fourth wavelength, viz. ($\frac{1}{4}$) $\lambda g$ for resonation of the antenna 5. When the feeder point (print pattern 7) of the antenna 5 is defined as a reference, a phase at an open end of the antenna becomes $\pi/2$. FIGS. 2 and 21 show relations between a distance (distance along line) from a feeder point and a signal phase employing the feeder point as a reference about the antenna 5 and the conventional helical antenna 202 respectively. As shown in FIG. 21, the signal phase of the conventional helical antenna 202 varies over whole length of the antenna, and the length of the antenna 202 is almost defined by a frequency. On the contrary, in the transmitter-and-receiver device 1 of this embodiment, a necessary phase is almost served by the loading coil 8, and a major portion of the antenna 5 is almost equal to the phase at the antenna open end. Accordingly the antenna 5 can be miniaturized by shortening the antenna or be elongated, whereby a free degree of design is improved.

Particularly, since in shortening the antenna for miniaturization the whole length of the antenna has a phase close to the phase at the antenna open end, there is obtained a large radiating face in comparison with the helical antenna 202 and the decrease of receive sensitivity and transmit power is minimized.

By thinning the antenna 5 the height of the antenna (the distance between the antenna 5 and the circuit board 2) may have room, and radiation resistance can be decreased in comparison with the helical antenna 202.

Even if the antenna 5 of this invention is miniaturized and thinned, efficiency drop of the antenna is relatively reduced in comparison with the helical antenna 202, and the reduction of receive sensitivity and increase of the transmit-and-receive resistance is suppressed.

As shown in FIG. 2, the change of phase of a signal along the antenna 5 is defined by the loading coil 8 and not so affected by the length of the antenna 5. Accordingly, when the antenna 5 having a different frequency specification is required, the loading coil 8 has only to be replaced with a coil having a different inductance without changing the metal plate portion of the antenna 5 and the common use of the components reduces the manufacturing cost of the antenna. In the conventional antenna, however, the phase of the signal is defined by the length of the helical antenna 202 as shown in FIG. 21, so that the helical antenna 202 has to be replaced with other one when the frequency specification is changed.

Since the antenna 5 and the loading coil 8 are separated, the loading coil may employ a print coil, a chip coil, a small wound coil or the like, and its manufacturing cost is reduced with improving the productivity.

Experimentally there is assembled a receiver for a keyless entry system by employing a transmitter-and-receiver device 201 enclosing the helical antennas 202 as shown in FIGS. 19 and 20. The device 201 is located at a height of 1 meter on an asphalt road surface having no obstacle far away, and a working distance where the receiver is actuated by a radio wave transmitted from the transmitter (electronic key) of the keyless entry system is measured. The measured working distance characteristic is shown by a dotted line 56 of FIG. 3.

Figure 3:
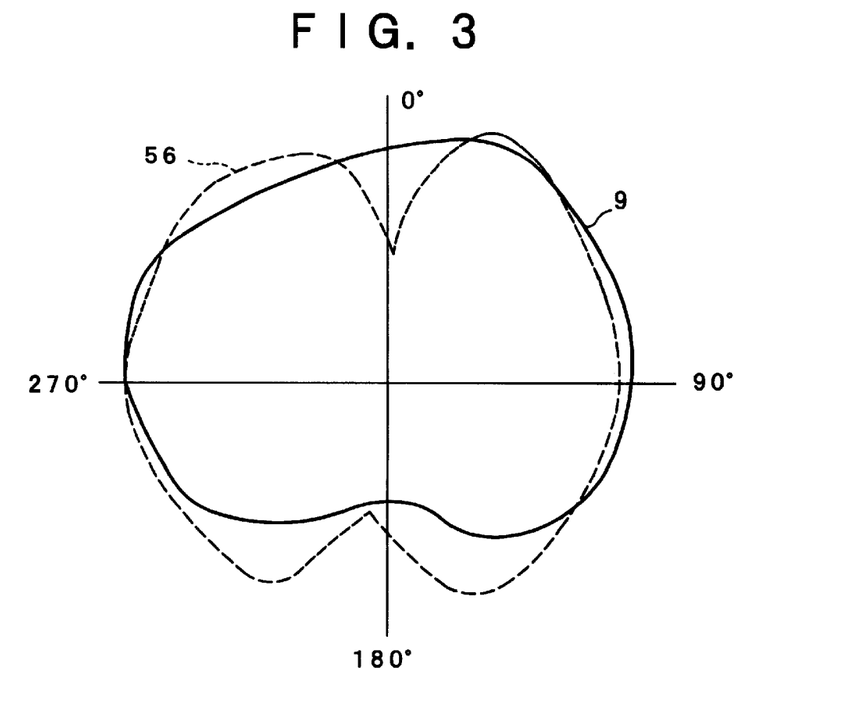
FIG. 3 shows a working distance characteristic of this embodiment and a working distance characteristic of a conventional receiver.

Meanwhile, there is assembled a transmitter-and-receiver device (receiver of a keyless entry system) having a construction of FIG. 1, which has a working distance characteristic similar to that of the conventional receiver as shown in a solid line 9 of FIG. 3. As a result, in the receivers having a same working distance characteristic, the volume of the antenna 5 of FIG. 1 is reduced to one fourth of that of the conventional receiver enclosing the helical antenna 202. Thus miniaturized receiver of this embodiment is not so reduced about the receive sensitivity.

Figure 4:
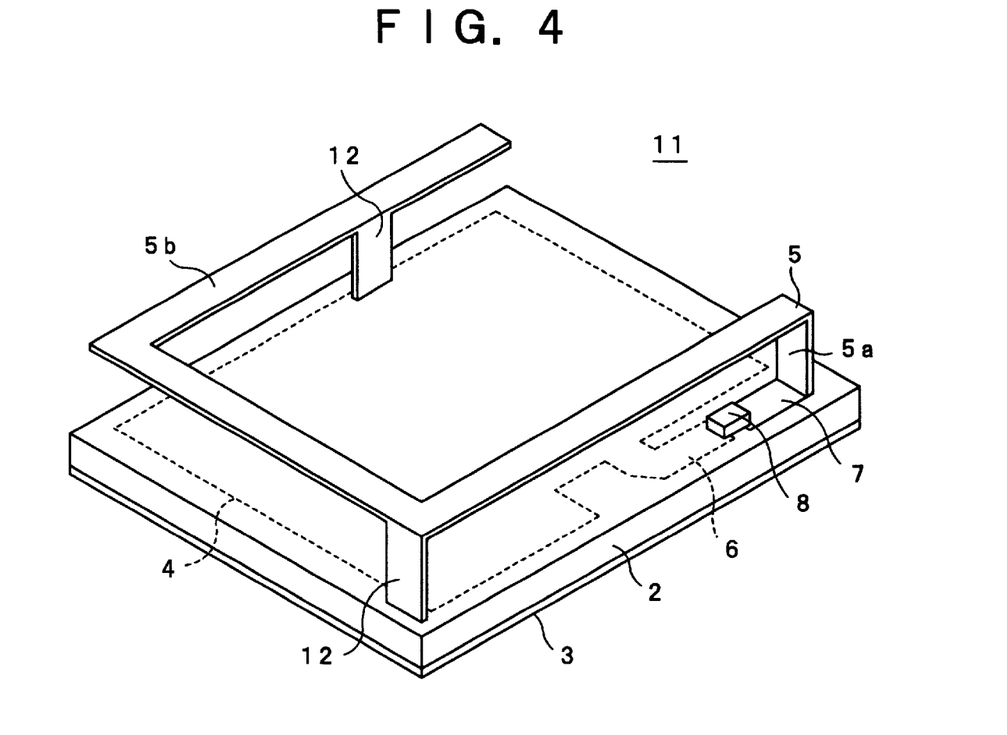
FIG. 4 is a perspective view of a transmitter-and-receiver device as a second embodiment of this invention.

In FIG. 4 there is shown a transmitter-and-receiver device 11 according to a second embodiment of this invention, in which there are disposed a pair of antenna supports 12 standing on a print board 2 which are of a pillar type and extending from a horizontal portion 5b of an antenna 5 as a single unit. The antenna supports 12 are electrically insulated from a signal process circuit section 4 and an earthing conductor 3 on the print board 2. The antenna supports 12 may be disposed separately from the antenna 5, and be made of insulating materials. Thus, the antenna 5 is supported by the antenna supports 12, whereby the rigidity of the antenna 5 is maintained to be high when the length of the antenna is elongated and the vibration resistance is improved. Even when the antenna 5 is elongated to increase the transmit-and-receive efficiency, it is hard to be swung by external vibration. Accordingly, the receive sensitivity is stabled, and the antenna 5 is hard to be bent or broken by the external vibration.

Figure 5:
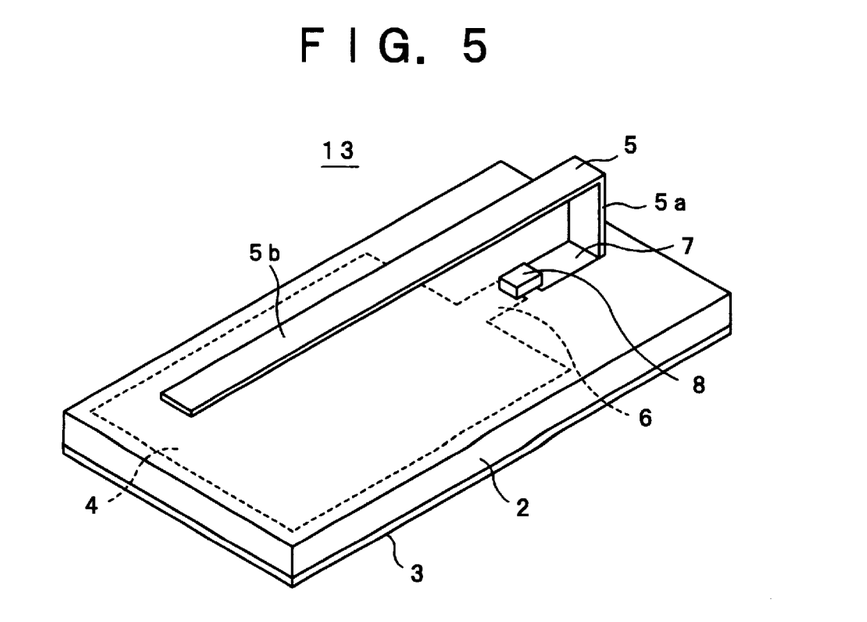
FIG. 5 is a perspective view of a transmitter-and-receiver device as a third embodiment of this invention.

In FIG. 5 there is shown a transmitter-and-receiver device 13 according to a third embodiment of this invention, in which a horizontal portion 5b of an antenna 5 is of a straight line type. Thus device 13 allows the antenna 5 to have a simplified construction.

Figure 6:
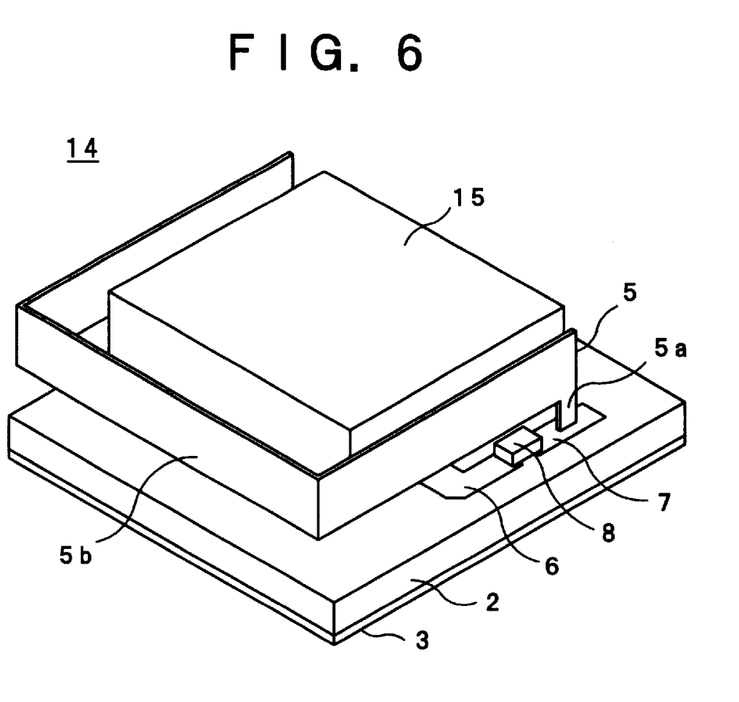
FIG. 6 is a perspective view of a transmitter-and-receiver device as a fourth embodiment of this invention.

In FIG. 6 there is shown a transmitter-and-receiver device 14 according to a fourth embodiment of this invention, in which a high frequency signal process circuit section including a transmit-and-receive circuit is mounted on a print board 2 and covered with a metal housing 15 for shielding. A loading coil 8 is mounted between a print pattern 6 of the signal process circuit section and a print pattern 7 of an antenna 5. A vertical portion 5a and a horizontal portion 5b are made of a thin metal plate extending from the print pattern 7 of the antenna 5, and surrounding the metal housing 15 at a given distance from the housing 15. In this embodiment, the metal housing 15 serves as an earthing conductor 3, and a radio wave is radiated or received through a space between the antenna 5 and the earthing conductor 3. The device 14 of this embodiment can be miniaturized without decreasing the receive sensitivity and the transmit power and without increasing the transmit-and-receive resistance.

Returning to FIG. 7, there is shown a perspective view of a transmitter-and-receiver device 121 as fifth embodiment of this invention, which includes a print board (circuit board) 122 and an antenna 123 standing on the board 122. There are disposed an earthing conductor 124 on a whole lower wall or the reverse of the board 122, and a transmit-and-receive circuit section (its mounting area is shown in a dotted line) 125 and an antenna pattern 126 on an upper wall or the right side of the board.

Figure 7:
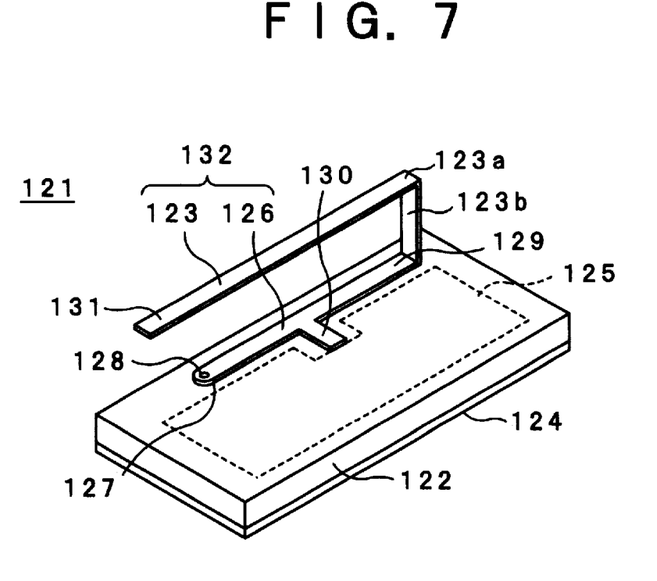
FIG. 7 is a perspective view of a transmitter-and-receiver device as a fifth embodiment of this invention.

The antenna pattern 126 serve as a part of a circuit pattern (copper foil pattern) of the circuit board 122, and is disposed on one end of the board in a straight line along an edge thereof. The antenna pattern 126 at one end thereof is provided with an earth end 127 of the antenna and at another end thereof is provided a connection portion 129 connected with the antenna body 123. The earth end 127 of the antenna pattern 126 is connected with the earthing conductor 124 on the reverse wall of the board through a through hole 128. A feeder line 130 extends from a middle point between the earth end 127 and the connection portion of the antenna pattern 126 as a single unit therewith, and one end of the feeder line 130 is connected with the transmit-and-receive circuit section 125.

The antenna body 123 is made of a thin metal plate such as an aluminum plate which is bent to have a vertical portion 123b vertical to the print board 122 and a horizontal portion 123a in parallel with the board 122. The antenna body 123 is secured into the print board 122 by inserting one end of the vertical portion 123b into an aperture of the board 122, and stands on the board at a distance between the horizontal portion 123a and the board 122 in which the vertical portion 123b and the antenna pattern 126 are electrically connected by soldering. Thus, the antenna 132 is constituted with the antenna body 123 and the antenna pattern 126, and a tip of the horizontal portion 123a serves as an open end 131 of the antenna 132. A major portion of the antenna body 123 is parallel with the board 122, and the horizontal portion 123a thereof confronts the antenna pattern 126 in parallel therewith.

In the transmitter-and-receiver device provided with thus constructed antenna 132, one part (antenna pattern 126) of the antenna 132 is provided with a pattern of the print board 122, whereby the antenna body 123 itself is reduced in size. When the antenna 132 having a same electric length is provided, the antenna 132 and the transmitter-and-receiver 121 may be miniaturized and thinned.

Since the feeder line 130 is disposed between the earth end 127 and the open end 131, the input impedance of the antenna 132 is easily adjusted by moving the feeder position in the same way as a conventional reverse F-shaped antenna.

Since one part of the antenna 132 is provided with a pattern of the print board 122, the antenna pattern 126 may be simultaneously produced in a process for producing the pattern of the print board 122, resulting in improvement of productivity of the transmitter-and-receiver and reduction of manufacturing cost.

Figure 8:
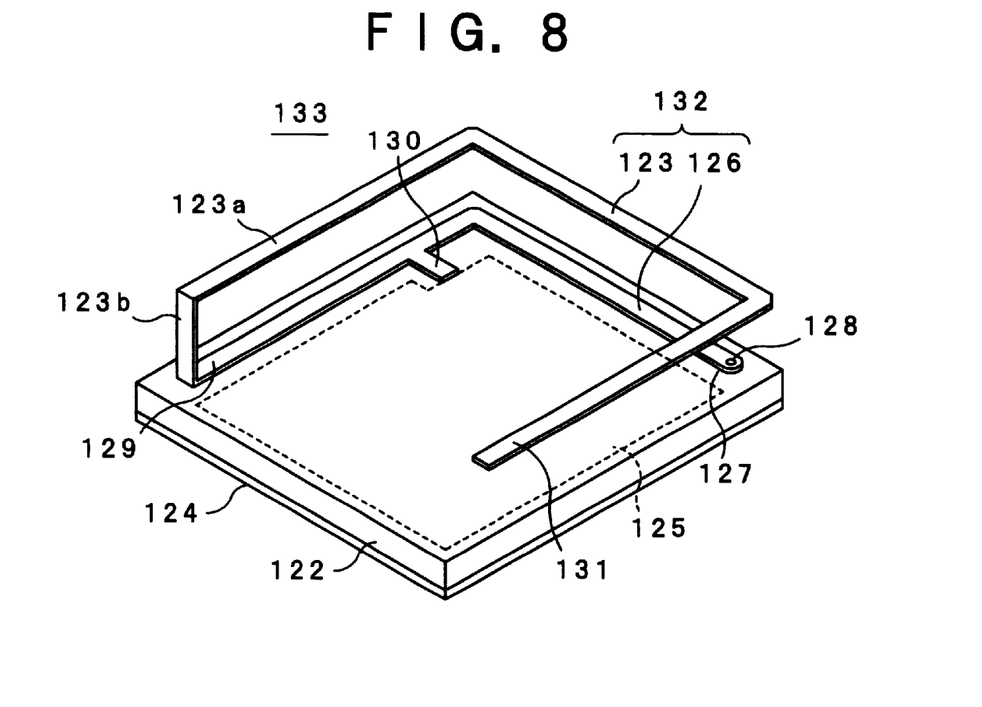
FIG. 8 is a perspective view of a transmitter-and-receiver device as a sixth embodiment of this invention.

In FIG. 8 there is shown a perspective view of a transmitter-and-receiver device 133 as a sixth embodiment of this invention, in which a horizontal portion 123a of an antenna body 123 is bent within a plane parallel to a print board 122, and particularly along a peripheral edge of the board. An antenna pattern 126 also is bent along the peripheral edge of the board 122 to confront the bent antenna body 123.

Thus bent antenna body 123 and antenna pattern 126 enable the antenna length to be elongated as far as possible within a limited volume, and the transmitter-and-receiver device 133 may be fairly miniaturized when the antenna 132 having a given electric length is constructed.

Figure 9:
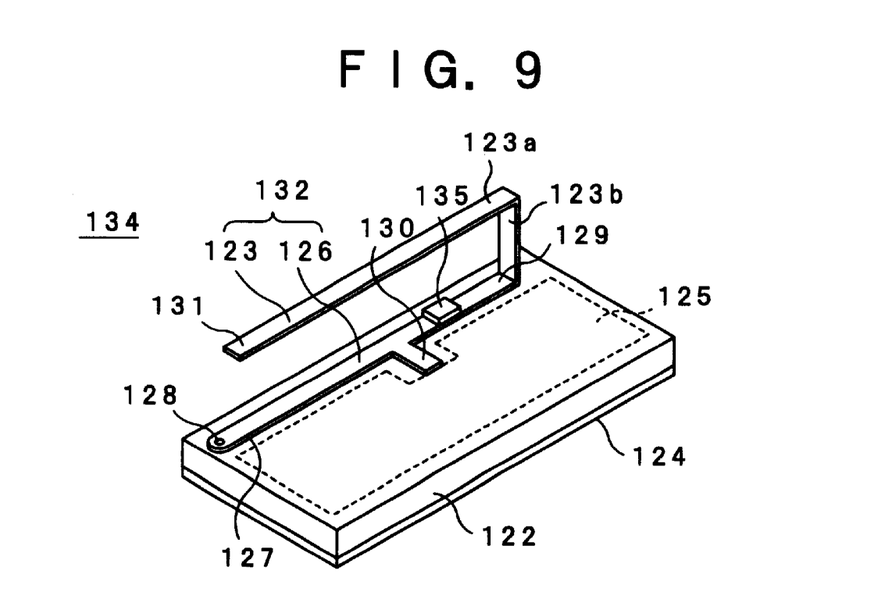
FIG. 9 is a perspective view of a transmitter-and-receiver device as a seventh embodiment of this invention.

In FIG. 9 there is shown a perspective view of a transmitter-and-receiver device 134 as a seventh embodiment of this invention, in which an antenna pattern 126 is cut out between a connection portion 129 and a feeder line 130 and the cut portions of the antenna pattern 126 are connected by a loading coil 135 crossing the portions. The loading coil 135 may employ a copper foil print coil forming an electrode pattern of a coil shape, a laminated chip coil forming an electrode pattern of a coil shape within a magnetic material layer, or a small wound coil of a mounting type such as a solenoid type or a troidal type which is small relative to the antenna 132, which should have an inductance corresponding to a length of the antenna 132.

Figure 10:
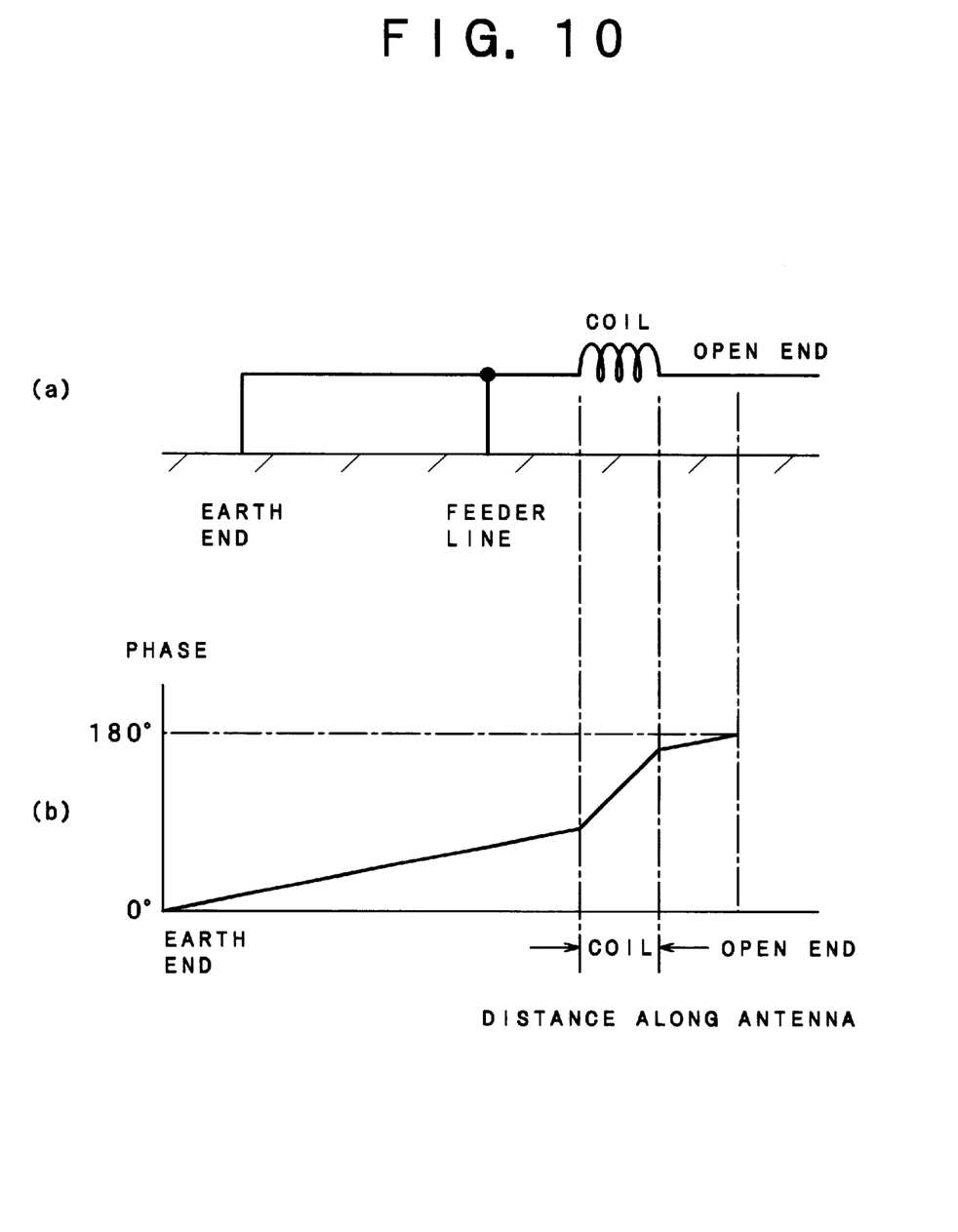
FIG. 10 shows at (a) a schematic construction of an antenna employed in the seventh embodiment, and at (b) change of a phase of a signal in the antenna.

FIG. 10 at (a) shows a schematic construction of the antenna employed of this embodiment in which a coil (loading coil 135) is inserted in a part of a reverse F-shaped antenna, and FIG. 10 at (b) shows a change of a phase of a signal along the antenna. As shown in FIG. 10, the advancement of a phase is accelerated at the insertion position of the coil, and the electric length is increased at the position of the coil. Thus, a physically short antenna may resonate at a low frequency by inserting a coil and the antenna may be miniaturized.

In this embodiment, the electric length of the antenna 132 may be changed by changing an inductance value of the loading coil 135. Accordingly, the electric length of the antenna may be changed by replacing the loading coil 135 with a coil having a different inductance, without changing an antenna body length nor an antenna pattern length. Thus, a common use of components can be made between transmitter-and-receiver devices having different frequencies.

Figure 11:
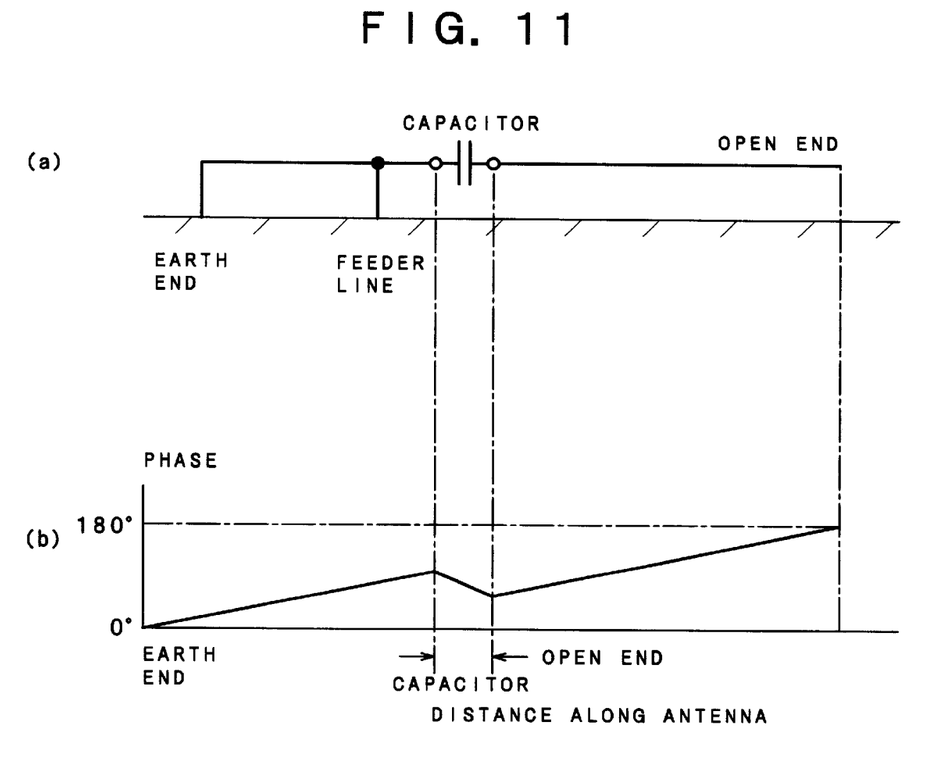
FIG. 11 shows at (a) a schematic construction of an antenna employed in a transmitter-and-receiver device as an eighth embodiment of this invention, and at (b) change of a phase of a signal in the antenna.

In FIG. 11 there are shown at (a) a schematic construction of an antenna employed in a transmitter-and-receiver device as an eighth embodiment of this invention, and at (b) change of a phase of a signal in the antenna, in which a capacitor is mounted instead of the coil 135 of FIG. 9 in the seventh embodiment. In the antenna employing the capacitor, the phase of a signal in the antenna may be reversed contrary to the coil, and a physically large antenna resonates at a high frequency. Accordingly the antenna is enlarged, not miniaturized, by inserting a capacitor.

When such a capacitor is employed in this embodiment, however, a space is saved in physical layout by serving the antenna pattern on the print board as a part of the antenna and the antenna pattern serves as a kind of a microstrip line, whereby the wavelength on the antenna pattern (microstrip line) can be shortened at a shrinking rate corresponding to a dielectric constant of the print board. Accordingly, when an area on the print board to be printed with the antenna pattern is broad or the dielectric constant of the print board is large, the necessary antenna length (antenna body length+ antenna pattern length) is taken larger than a desired frequency and the frequency is adjusted by capacitor. The antenna may be miniaturized even when the frequency of the capacitor is adjusted, and the manufacturing cost for the device employing capacitors can be reduced in comparison with the coil construction.

Figure 12:
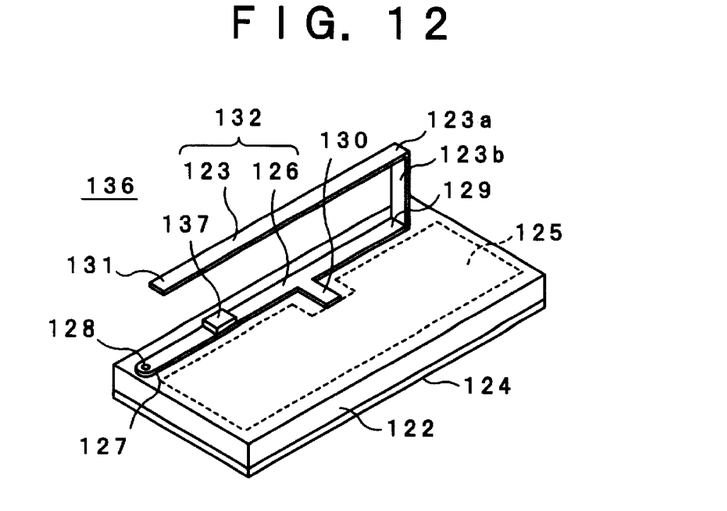
FIG. 12 is a perspective view of a transmitter-and-receiver device as a ninth embodiment of this invention.

FIG. 12 is a perspective view of a transmitter-and-receiver device 136 as a ninth embodiment of this invention, in which an antenna pattern 126 is cut out between a earth end 127 and a feeder line 130 and the cut portions of the antenna pattern 126 are connected by a loading coil 137 crossing the portions. The loading coil 137 may employ any type of coil, but a small coil is preferable. The coil having a proper inductance corresponding to the length of an antenna 132 should be mounted.

In this embodiment the inductance value of the loading coil 137 may be changed to change the electric length of the antenna 132, whereby the antenna can be decreased in size. The change of the electric length of the antenna can be done by changing the loading coil 137 with a coil having a different inductance, without changing an antenna body 123 and nor an antenna pattern 126. Thus, a common use of components is applicable between transmitter-and-receiver devices designed by different frequency specifications. If desired, the loading coil 137 may be replaced with a capacitor.

Figure 13:
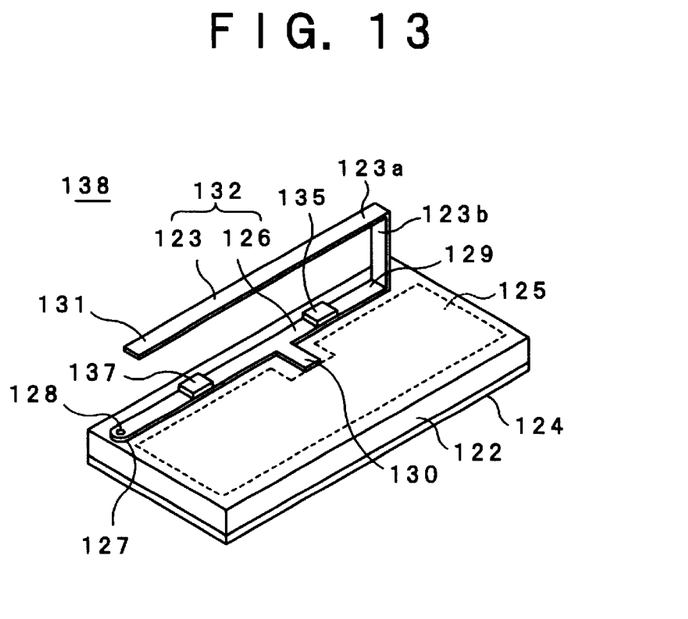
FIG. 13 is a perspective view of a transmitter-and-receiver device as a tenth embodiment of this invention.

FIG. 13 is a perspective view of a transmitter-and-receiver device 138 as a tenth embodiment of this invention, in which an antenna pattern 126 is cut out at a middle between a connection portion 129 with an antenna body 123 and a feeder line 130 and the cut portions of the antenna pattern 126 are connected by a loading coil 135 crossing the portions, and in which the antenna pattern 126 is cut out between an earth end 127 and a feeder line 130, and the cut portions of the antenna pattern 126 are connected by a loading coil 137 across the portions. The coils 135 and 137 having proper inductances corresponding to a length of an antenna 132 are mounted. By the combination of inductance values of the loading coils 135 and 137, the input impedance can be variably adjusted without changing a feeder position of the feeder line 130. In this embodiment, the loading coils 135 and 137 may be replaced with capacitors if desired.

Figure 14:
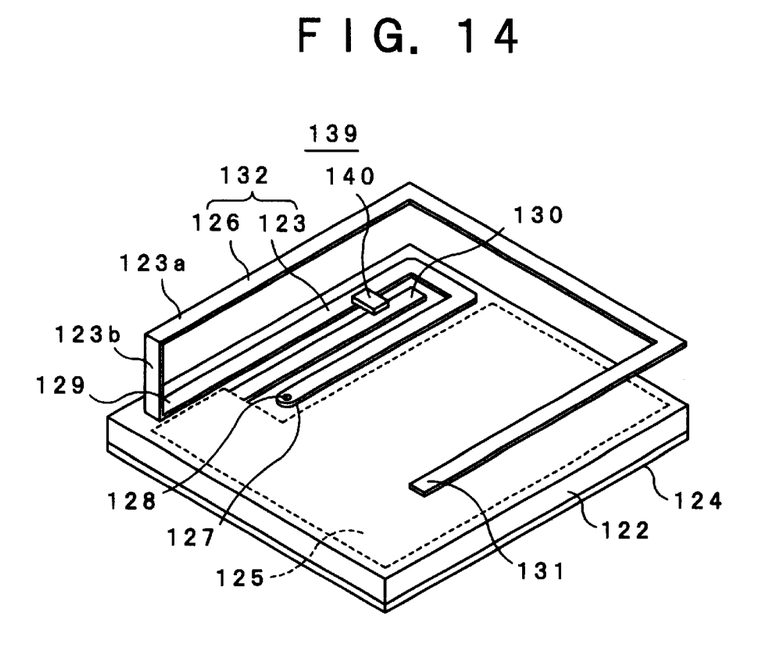
FIG. 14 is a perspective view of a transmitter-and-receiver device as an eleventh embodiment of this invention.

FIG. 14 is a perspective view of a transmitter-and-receiver device 139 as an eleventh embodiment of this invention, in which a feeder line 130 extends in a straight line from a transmit-and-receive circuit section 125 and an antenna pattern 126 extending from an earth end 127 to a connection portion 129 is disposed at a distance from the feeder line 130 to surround the feeder line 130 in parallel therewith. The antenna pattern 126 and the feeder line 130 are not directly connected by a pattern of a print board 122, but connected through a jumper chip 140. The chip 140 may be replaced with a conducive wire, a metal lead or the like to connect the pattern 126 and the line 130. Since the pattern 126 and the line 130 are connected by the chip 140, a feeder position of an antenna 132 may be changed by changing a connecting position of the jumper chip 140 so that the input impedance can be easily changed to a desired impedance.

Figure 15:
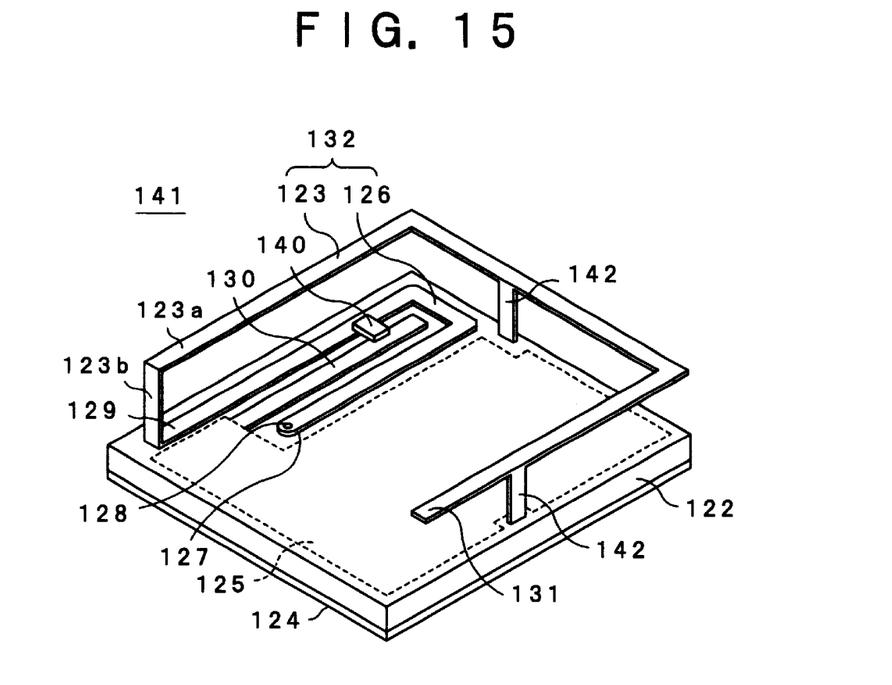
FIG. 15 is a perspective view of a transmitter-and-receiver device as a twelfth embodiment of this invention.

FIG. 15 is a perspective view of a transmitter-and-receiver device 141 as a twelfth embodiment of this invention, in which a pair of antenna supports 142 extend from an antenna body 123 to a print board 122, and at lower ends thereof stand outside of a circuit pattern of the board 122. The supports 142 may be made of the same materials as that of the antenna body 123 as a single unit with the body 123, or of different materials (such as plastics). In this construction of this embodiment the rigidity of the antenna body 123 is increased and the vibration resistance is improved.

Figure 16:
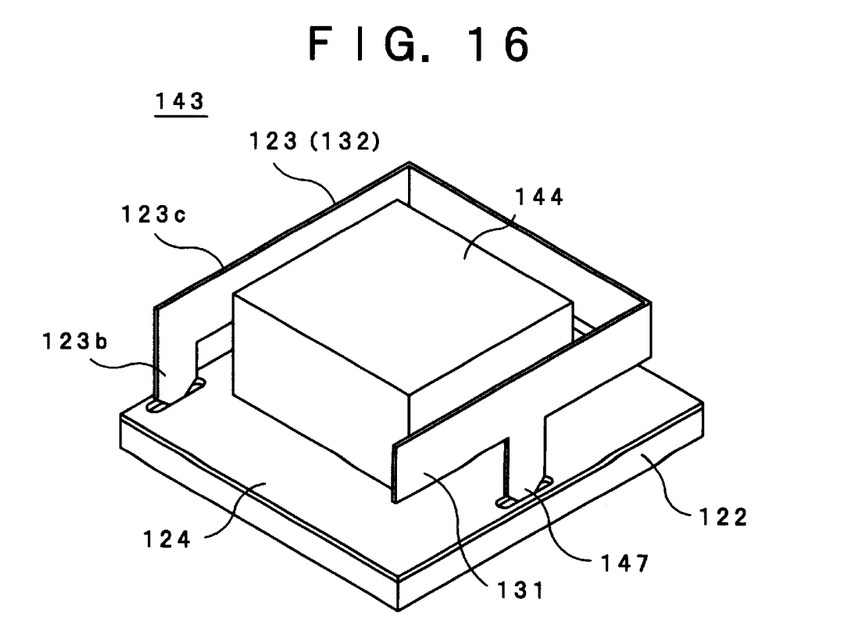
FIG. 16 is a perspective view of a transmitter-and-receiver device as a thirteenth embodiment of this invention.
Figure 17:
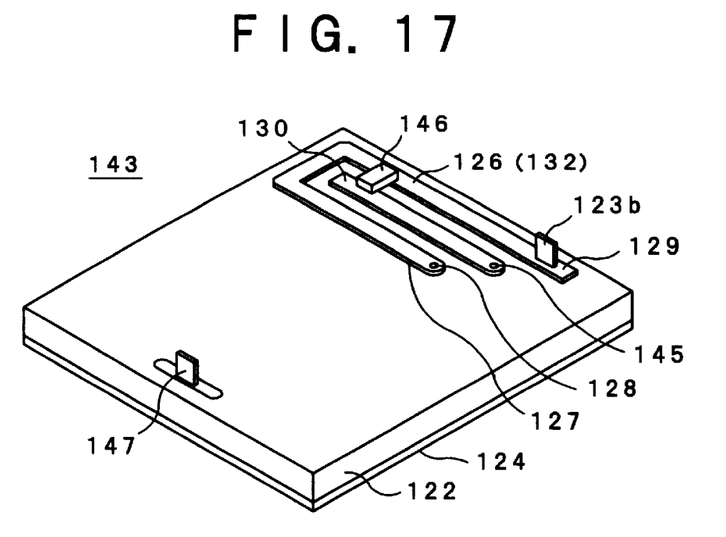
FIG. 17 is a perspective view of the transmitter-and-receiver device of FIG. 16 viewed from a reverse wall thereof.

FIG. 16 shows a perspective view of a transmitter-and-receiver device 143 as a thirteenth embodiment of this invention, and FIG. 17 shows a perspective view of the device 143 viewed from a reverse wall thereof, in which a transmit-and-receive circuit section (a high frequency circuit section) disposed on an upper wall of a print board 122 is covered with a metal housing 144 and an earthing conductor 124 is disposed around the housing 144 to be connected with the same. Accordingly, the metal housing 144 serves as the earthing conductor 124, and a bent antenna body 123 made of a thin metal plate confronts external peripheral walls of the metal housing 144 at a distance.

On the reverse of the print board 122 there is a feeder line 130 and an antenna pattern 126 is disposed around the feeder line 130. One end of the feeder line 130 is connected with the transmit-and-receive circuit section mounted on the right side of the board through a through hole 145. An earth end 127 of the antenna pattern 126 is connected with the earthing conductor 124 through a through hole 128. A chip coil 146 as a loading coil is mounted across the feeder line 130 and the antenna pattern 126 so as to connect the line 130 with the pattern 126 through the coil 146.

One end of a peripheral portion 123c of the antenna body 123 extending vertical and parallel to the print board 123 is an open end 131, a vertical portion 123b extending downward from other end of the peripheral portion 123c pierces the print board 122 to be connected with a connection portion 129 of the antenna pattern 126 on the reverse surface. There is disposed a support 147 for supporting the antenna.

In this embodiment, a part of the antenna 132 is represented by the antenna pattern 126, and the miniaturization of the antenna 132 and the transmit-and-receive device 143 is performed. In case there is a space for accommodating the antenna pattern 126 on the right side of the print board 122, the pattern 126 may be disposed on the right side.

Figure 18:
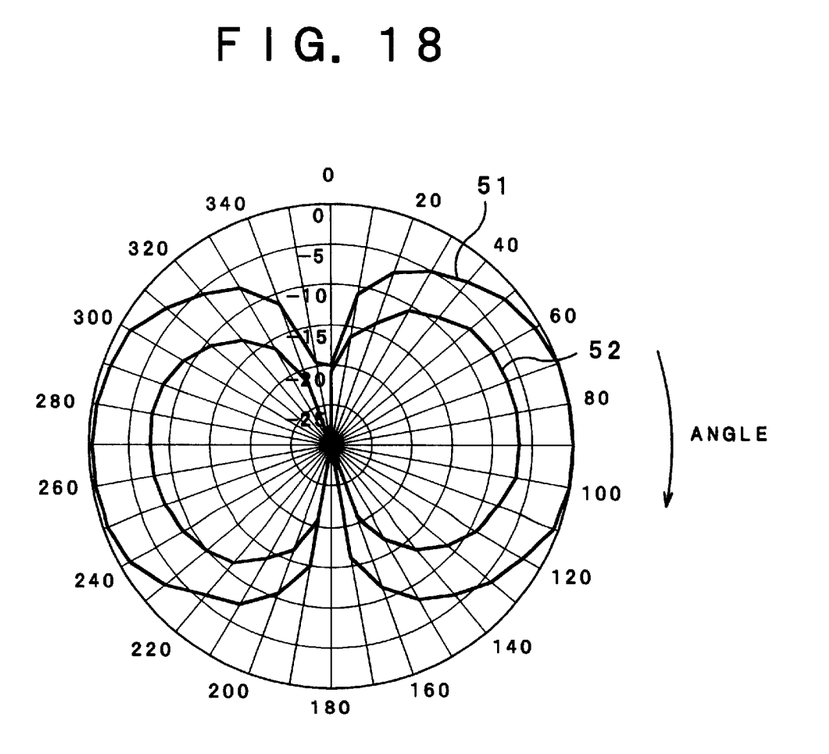
FIG. 18 shows a relative gain characteristic graph in conventional and the present transmitter-and-receiver device.

FIG. 18 shows a relative gain characteristic of the conventional transmitter-and-receiver device as shown in FIG. 19 and the device of this invention as shown in FIG. 7. The relative gain of the transmitter-and-receiver device of this invention is represented by a curve 151, and the relative gain of the conventional device is represented by a curve 152. A radius direction of FIG. 18 represents a relative gain of the transmitter-and-receiver device. Though a volume of the antenna 132 enclosed in the device of this invention is about one third of that of the conventional device, a gain about 7 dB at maximum is increased. Thus, the transmitter-and-receiver device according to this invention provides miniaturization and improvement of the sensitivity.

The transmit-and-receiver device in the foregoing embodiments are mainly designed for a vehicle mounting component, particularly a receiver for a keyless entry system to lock or unlock a door of a vehicle by a signal sent by a radio wave, but may be designed for other objects.

While the invention has been described and illustrated with respect to certain embodiments which give satisfactory results, it will be understood by those skilled in the art, after understanding the purpose of the invention, that various other changes and modifications may be made without departing from the spirit and scope of the invention, and it is therefore, intended in the appended claims to cover all such changes and modifications.

What is claimed is:

1. A transmitter-and-receiver device comprising
a circuit board including an earthing conductor and a transmit-and-receive circuit section which are disposed on the board,
a loading coil disposed on said circuit board, said loading coil adjusting a phase of a resonance signal by about $\pi/2$, and
an antenna electrically connected with said transmit-and-receive circuit section through said loading coil.

2. A transmitter-and-receiver device according to claim 1, in which said loading coil is a print coil.

3. A transmitter-and-receiver device according to claim 2, in which said antenna is of a L-shaped type in which the antenna horizontally extends from a vertical direction on a surface of said circuit board.

4. A transmitter-and-receiver device according to claim 2, in which said earthing conductor employs a metal housing enclosing said transmit-and-receive circuit section and said antenna is disposed around a periphery of said metal housing.

5. A transmitter-and-receiver device according to claim 1, in which said loading coil is a chip coil.

6. A transmitter-and-receiver device according to claim 5, in which said antenna is of a L-shaped type in which the antenna horizontally extends from a vertical direction on a surface of said circuit board.

7. A transmitter-and-receiver device according to claim 5, in which said earthing conductor employs a metal housing enclosing said transmit-and-receive circuit section and said antenna is disposed around a periphery of said metal housing.

8. A transmitter-and-receiver device according to claim 1, in which said loading coil is a small wound coil.

9. A transmitter-and-receiver device according to claim 8, in which said antenna is of a L-shaped type in which the antenna horizontally extends from a vertical direction on a surface of said circuit board.

10. A transmitter-and-receiver device according to claim 8, in which said earthing conductor employs a metal housing enclosing said transmit-and-receive circuit section and said antenna is disposed around a periphery of said metal housing.

11. A transmitter-and-receiver device according to claim 1, in which said antenna is of a L-shaped type in which the antenna horizontally extends from a vertical direction on a surface of said circuit board.

12. A transmitter-and-receiver device according to claim 11, in which a portion of said antenna in parallel with the surface of said circuit board bends within a plane parallel to the surface of said circuit board.

13. A transmitter-and-receiver device according to claim 12, in which said antenna bends within the plane parallel to said circuit board and along a peripheral edge thereof.

14. A transmitter-and-receiver device according to claim 12 further comprising an antenna support disposed between said antenna and said circuit board for supporting said antenna.

15. A transmitter-and-receiver device according to claim 1, in which said earthing conductor employs a metal housing enclosing said transmit-and-receive circuit section and said antenna is disposed around a periphery of said metal housing.

16. A transmitter-and-receiver device comprising a circuit board on which an earthing conductor, an antenna pattern and a transmit-and-receive circuit section are disposed, and an antenna body electrically connected with said antenna pattern on said circuit board to form an antenna with said antenna pattern, one end of said antenna body opposite to a connection side connected with said antenna pattern being an open end, one end of said antenna pattern opposite to a connection side connected with said antenna body being an earth end, and a feeder line being electrically connected with a middle between a connection portion with said antenna body and said earth end of said antenna pattern.

17. A transmitter-and-receiver device according to claim 16 in which said antenna body is bent within a plane in parallel with a surface of said circuit board.

18. A transmitter-and-receiver device according to claim 16 in which a coil is mounted on said antenna pattern.

19. A transmitter-and-receiver device according to claim 18 in which one coil is mounted on said antenna pattern between said connection portion with said antenna body and said feeder line, and another coil is mounted on said antenna pattern between said feeder line and said earth end.

20. A transmitter-and-receiver device according to claim 16 in which a capacitor is mounted on said antenna pattern.

21. A transmitter-and-receiver device according to claim 20 in which one capacitor is mounted on said antenna pattern between said connection portion with said antenna body and said feeder line, and another capacitor is mounted on said antenna pattern between said feeder line and said earth end.

22. A transmitter-and-receiver device according to claim 16 in which said antenna pattern and said feeder line are disposed at a given distance, and connected each other through a connecting element.

23. A transmitter-and-receiver device according to claim 16 further comprising an antenna support for supporting said antenna body which is disposed between said antenna body and said circuit board.

24. A transmitter-and-receiver device according to claim 16 in which a metal housing enclosing said transmit-and-receive circuit serves as an earthing conductor, and said antenna body surrounds said metal housing.

25. A transmitter device comprising a circuit board including an earthing conductor and a transmit circuit section which are disposed on the board, a loading coil disposed on said circuit board, said loading coil adjusting a phase of a resonance signal by about π/2, and an antenna electrically connected with a transmit-and-receive circuit section through said loading coil.

26. A transmitter device comprising a circuit board on which an earthing conductor, an antenna pattern and a transmit circuit section are disposed, and an antenna body electrically connected with said antenna pattern on said circuit board to form an antenna with said antenna pattern, one end of said antenna body opposite to a connection side connected with said antenna pattern being an open end, one end of said antenna pattern opposite to a connection side connected with said antenna body being an earth end, and a feeder line being electrically connected with a middle between a connection portion with said antenna body and said earth end of said antenna pattern.

27. A receiver device comprising a circuit board including an earthing conductor and a receive circuit section which are disposed on the board, a loading coil disposed on said circuit board, said loading coil adjusting a phase of a resonance signal by about π/2, and an antenna electrically connected with a transmit-and-receive circuit section through said loading coil.

28. A receiver device comprising a circuit board on which an earthing conductor, an antenna pattern and a receive circuit section are disposed, and an antenna body electrically connected with said antenna pattern on said circuit board to form an antenna with said antenna pattern, one end of said antenna body opposite to a connection side connected with said antenna pattern being an open end, one end of said antenna pattern opposite to a connection side connected with said antenna body being an earth end, and a feeder line being electrically connected with a middle between a connection portion with said antenna body and said earth end of said antenna pattern.

* * * * *